Patented Dec. 1, 1942

2,303,606

UNITED STATES PATENT OFFICE 2,303,606

CREAM OF TARTAR PRODUCTION FROM ACID EXTRACT OF TARTAROUS MATERIAL

Geza Braun, New York, N. Y., assignor to Standard Brands Incorporated, New York, N. Y., a corporation of Delaware No Drawing. Application August 3, 1940, Serial No. 351,165

6 Claims. (Cl. 260—536)

The invention relates to a procedure for the production of cream of tartar, i. e., potassium hydrogen tartrate, from an acid extract. More particularly, it pertains to the preparation of cream of tartar from an acid extract of lees or argols, and includes correlated improvements and discoveries which enhance the preparation thereof.

Cream of tartar has been manufactured heretofore from an acid extract of argols with the obtainment of a product containing 97-98% potassium hydrogen tartrate. This product, while relatively pure, however, does not meet present day standards.

An object of the present invention is the provision of a process in accordance with which cream of tartar may be obtained from an acid extract of tartarous materials in a condition of purity which meets present day standards.

A further object of the invention is to provide a process for the production of cream of tartar from an acid extract containing tartaric acid in a manner which may be readily, effectively and economically carried out commercially.

An additional object of the invention is the provision of a process in accordance with which cream of tartar having a purity of 99.9% potassium acid tartrate may be obtained from an acid extract of argols and/or lees.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention cream of tartar may be prepared from an acid, usually hydrochloric or sulfuric acid, extract of argols and/or lees. It is advisable to treat argols and lees preliminarily in order to facilitate the extraction and separation of the extract from the solid residue. If the tartarous raw materials, i. e., the lees and argols are dry the preliminary treatment may simply be a roasting, whereas if they are in the moist condition heating is carried out in an autoclave. The argols or lees may be extracted with an amount of acid which suffices to dissolve the tartarous materials consisting principally of potassium acid tartrate and calcium tartrate at a temperature of about 80° C. This extract may be advantageously produced with contacting of the materials in accordance with countercurrent principle.

Further, it is advisable to remove iron present through precipitation with a ferro-cyanide. This desirably is effected prior to filtration. There is thus obtained an extract which is substantially iron-free, with an average content of potassium acid tartrate of 25%, which may be clarified by having incorporated therewith from 3 to 5% of a decolorizing material, and following a period of treatment therewith the mass may be filtered, as through a filter press. There is thus obtained a pure colorless filtrate containing potassium acid tartrate, and from it cream of tartar may be produced by having the extract at a temperature which may be about 80° C., and adding thereto a solution of a potassium salt. Potassium chloride may be employed as the potassium salt, and its introduction may be in the form of a saturated solution.

Following introduction of this salt, an alkali, for example, sodium carbonate, may be introduced, preferably slowly, until the preponderant amount of acid has been neutralized. This may be until the pH value of the solution has been brought to about 1.2 to about 1.8. Thereupon the reaction mass is cooled, with separation of cream of tartar as a crystalline mass. This may be separated from liquor by a centrifuge, vacuum filter, or other suitable filtering means, and the collected cream of tartar washed with water until it is free from chloride. Thereby a cream of tartar of high purity may be obtained and in a high yield, which may be substantially 90% of the theoretical. However, there is not any loss of tartarous material, inasmuch as the potassium acid tartrate remaining in the mother liquor may be obtained therefrom substantially quantitatively as calcium tartrate, and this calcium tartrate may then be returned to the process and finally yielding its potassium acid tartrate content as cream of tartar.

As an illustrative embodiment of a manner in which the invention may be practiced, the following procedure is presented:

An acid extract of tartarous materials, as of roasted argols, which has been purified with substantial removal of iron and coloring matter may be heated to about 80° C., and with stirring a saturated solution of potassium chloride may be added thereto. The amount of potassium chloride preferably is that which is equivalent to the content of neutral tartrates in the extract. Then, and over a period of about 15–30 minutes, a solution of sodium carbonate may be slowly introduced until the pH value of the solution is about 1.2 to about 1.8, or until 85–90% of the acid—hydrochloric or sulfuric—has been neutralized. The reaction mass is now cooled slowly to 20-25° C., with separation of cream of tartar, which may be removed by a centrifuge and washed until it is free from chloride. The cream of tartar thus obtained has a high purity of from 99.75 to 99.95% potassium acid tartrate, and the yield is about 90% theoretical.

The acid used may be either hydrochloric or sulfuric. In the event that hydrochloric acid is used some sulfuric acid is also included, and desirably in an amount which is equivalent to the calcium tartrate present in the argols. This is done in order to prevent an accumulation of calcium chloride in the mother liquor. By proceeding in this manner the mother liquor may be utilized repeatedly and until the impurities accumulate to an extent which would lead to a contamination of cream of tartar if it were further used as the extracting medium. Accordingly, in this manner, it is possible to extract cream of tartar from raw materials in concentrated form with a substantial economy in connection with the mineral acids used.

As indicated, either hydrochloric or sulfuric, or both of these acids may be employed. Further, if the extraction is conducted at a high temperature, e. g. 90-100° C., the theoretical amount, and even considerably less, of hydrochloric acid suffices. However, at lower temperatures more acid is required in order to bring about complete solution of the tartarous materials. Moreover, somewhat larger amounts of sulfuric are required than of hydrochloric acid, but otherwise the extraction and subsequent procedures are alike, including the yield of cream of tartar. When sulfuric acid serves as the extracting medium, the filtrate from the cream of tartar will contain rather large amounts of sodium sulfate, and this should be removed before precipitation of calcium tartrate by crystallization. Otherwise, there will be a loss of tartaric acid since from 3-5% escapes precipitation as calcium tartrate.

It may be added that during the purification removal of iron may be brought about by ferrocyanic acid, or a soluble salt thereof, which may be a sodium, potassium, calcium, or like salt. Moreover, an alkali other than sodium carbonate may be introduced, but such alkali should not cause formation of undesirable tartrates or acid tartrates. In addition to sodium carbonate there may be used other alkali carbonates or hydroxides, as sodium, potassium bicarbonate, potassium carbonate, sodium and potassium hydroxides, etc. These additionally may serve a further purpose in that they exercise an influence upon the crystal size and form of the cream of tartar produced.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for the production of cream of tartar, which comprises preparing a purified acid extract of tartarous material, heating to a temperature of about 80° C., adding a saturated solution of potassium chloride, neutralizing by adding slowly an alkaline reacting substance until the pH value is about 1.2 to 1.8, then cooling with attending crystallization of tartrate, and separating cream of tartar so produced from mother liquor.

2. A process for the production of cream of tartar, which comprises preparing a purified acid extract of tartarous material, heating to a temperature of about 80° C., adding a saturated solution of potassium chloride with constant stirring until an amount has been added which is equivalent to the neutral tartrate content of the extract, neutralizing with sodium carbonate solution until a pH value of 1.2 to 1.8 is attained, cooling to a temperature about 20-25° C., with separation of cream of tartar in crystalline form, and removing cream of tartar so obtained from mother liquor.

3. A process for the production of cream of tartar, which comprises preparing a purified acid extract of tartarous material, heating to a temperature of about 80° C., adding a saturated solution of potassium chloride with constant stirring until an amount has been added which is equivalent to the neutral tartrate content of the extract, neutralizing with sodium carbonate solution until a pH value of 1.2 to 1.8 is attained, cooling to a temperature about 20-25° C. with separation of cream of tartar in crystalline form, removing cream of tartar so obtained from mother liquor, and finally washing the cream of tartar until it is free from chloride.

4. A process for the production of cream of tartar, which comprises extracting tartarous material with a mineral acid to form a solution containing potassium hydrogen tartrate and calcium tartrate, removing impurities therefrom, heating, then adding to the purified solution a saturated solution of a potassium salt in an amount corresponding to the neutral tartrate content thereof, neutralizing to a pH value of about 1.2 to about 1.8, cooling with attending crystallization of cream of tartar, and separating cream of tartar so produced from mother liquor.

5. A process for the production of cream of tartar, which comprises preparing a purified acid extract of tartarous material, heating to a temperature of about 80° C., adding a solution of a potassium salt, neutralizing by adding slowly an alkaline reacting substance until the pH value is about 1.2 to 1.8, then cooling with attending crystallization of tartrate, and separating cream of tartar so produced from mother liquor.

6. A process for the production of tartar, which comprises preparing a purified acid extract of tartarous material, heating to a temperature of about 80° C., adding a saturated solution of a potassium salt, neutralizing by adding slowly an alkaline reacting substance until the pH value is about 1.2 to 1.8, then cooling with attending crystallization of tartrate, and separating cream of tartar so produced from mother liquor.

GEZA BRAUN.